United States Patent
Gill et al.

(10) Patent No.: US 10,061,669 B2
(45) Date of Patent: **\*Aug. 28, 2018**

(54) MECHANISM FOR PROVIDING REAL TIME REPLICATION STATUS INFORMATION IN A NETWORKED VIRTUALIZATION ENVIRONMENT FOR STORAGE MANAGEMENT

(71) Applicant: NUTANIX, INC., San Jose, CA (US)

(72) Inventors: Binny Sher Gill, San Jose, CA (US); Manosiz Bhattacharyya, San Jose, CA (US); Varun Kumar Arora, Santa Clara, CA (US)

(73) Assignee: NUTANIX, INC., San Jose, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/357,742

(22) Filed: Nov. 21, 2016

(65) Prior Publication Data
US 2017/0139793 A1    May 18, 2017

Related U.S. Application Data

(63) Continuation of application No. 14/251,180, filed on Apr. 11, 2014, now Pat. No. 9,501,379.

(51) Int. Cl.
*G06F 15/16* (2006.01)
*G06F 11/20* (2006.01)
(Continued)

(52) U.S. Cl.
CPC ......... *G06F 11/2094* (2013.01); *G06F 3/065* (2013.01); *G06F 3/0619* (2013.01); *G06F 3/0689* (2013.01); *G06F 9/45558* (2013.01); *G06F 2009/45583* (2013.01); *G06F 2201/85* (2013.01)

(58) Field of Classification Search
CPC .... G06F 11/2094; G06F 3/0619; G06F 3/065; G06F 3/0689
See application file for complete search history.

(56) References Cited

U.S. PATENT DOCUMENTS 6,880,052 B2    4/2005  Lubbers et al.
7,287,116 B2 * 10/2007  Iwami ................... G06F 3/0607
                                                                711/114

(Continued)

OTHER PUBLICATIONS

PCT International Search Report and Written Opinion for International Appln. No. PCT/US2015/025390, Applicant Nutanix, Inc., Forms PCT/ISA/210, 220, and 237, dated Jul. 8, 2015 (10 pages).

*Primary Examiner* — Mohamed A Wasel

(74) *Attorney, Agent, or Firm* — Vista IP Law Group, LLP

(57) ABSTRACT

A method for providing real time replication status for a networked virtualization environment for storage management, includes scanning metadata to identify replication status for all virtual disks (vDisks) in the networked virtualization environment, generating replication tasks for vDisks that are identified as under replicated based on the scan, performing the replication tasks, monitoring the progress of the replication tasks and determining the real time replication status of the networked virtualization environment based on the scanned metadata and the monitored progress of the replication tasks.

20 Claims, 11 Drawing Sheets

(51) Int. Cl.
  *G06F 9/455* (2018.01)
  *G06F 3/06* (2006.01)

(56) References Cited

U.S. PATENT DOCUMENTS

| | | |
|---|---|---|
| 8,135,930 B1 | 3/2012 | Mattox et al. |
| 8,549,518 B1 | 10/2013 | Aron et al. |
| 8,601,473 B1 | 12/2013 | Aron et al. |
| 8,863,124 B1 | 10/2014 | Aron |
| 2003/0188114 A1* | 10/2003 | Lubbers ............... G06F 11/2058 711/162 |
| 2003/0191904 A1* | 10/2003 | Iwami .................... G06F 3/0607 711/147 |
| 2010/0318757 A1* | 12/2010 | Beeken ............... G06F 11/1456 711/162 |
| 2012/0233123 A1* | 9/2012 | Shisheng ............. G06F 11/004 707/639 |
| 2014/0082413 A1* | 3/2014 | Bilich ................. G06F 11/2041 714/12 |
| 2014/0281690 A1* | 9/2014 | Hsu-Hung .......... G06F 11/2082 714/6.23 |

* cited by examiner

| vDisk ID | User VM | Total vDisk Size | Amount of Data Under Replicated | Replication Factor |
|---|---|---|---|---|
| vDisk 1-A | 1 | 100 GB | 20 GB | 1 |
| vDisk 1-B | 1 | 100 GB | 20 GB | 3 |
| vDisk 2-A | 2 | 500 GB | 20 GB | 1 |
| vDisk 2-B | 2 | 100 GB | 20 GB | 4 |
| vDisk 3-A | 3 | 250 GB | 20 GB | 4 |
| . . . | | | | |
| vDisk N-A | N | 100 GB | 20 GB | 4 |
| vDisk N-B | N | 500 GB | 20 GB | 1 |

FIG. 4

| vDisk ID | vDisk Block | Replication Factor |
|---|---|---|
| vDisk 1-A | 1 | 1 |
| | 2 | 2 |
| | 3 | 3 |
| | 4 | 3 |
| | 5 | 3 |

FIG. 5

|  | Rack 1 | | | Rack 2 | | |
| --- | --- | --- | --- | --- | --- | --- |
|  | Node 1 | Node 2 | Node 3 | Node 4 | Node 5 | Node 6 |
| vDisk 1 | Y | Y | N | N | N | N |
| vDisk 2 | Y | Y | N | Y | N | N |
| vDisk 3 | Y | N | N | N | Y | Y |

FIG. 7A

Supported Failure Nodes

| | Any 1 Node | Any 2 Nodes | Any 1 Rack |
|---|---|---|---|
| Status | Y | N | N |
| Reason | All vDisk have replication factor of 2 | vDisk 1 has a replication factor of 2 | vDisk 1 does not have replica in Rack 2 |

FIG. 7B

|  | Rack 1 | | | | Rack 2 | | |
|---|---|---|---|---|---|---|---|
|  | Node 1 | Node 2 | Node 3 | Node 4 | Node 5 | Node 6 |
| vDisk 1 | Y | N | N | N | N | Y |
| vDisk 2 | Y | Y | N | Y | N | N |
| vDisk 3 | Y | N | N | N | Y | Y |

FIG. 8A

| | Supported Failure Nodes | | |
|---|---|---|---|
| | Any 1 Node | Any 2 Nodes | Any 1 Rack |
| Status | Y | N | Y |
| Reason | All vDisks have replication factor of at least 2 | vDisk 1 has replication factor of 2 | All vDisks have replicas in both racks |

FIG. 8B

MECHANISM FOR PROVIDING REAL TIME REPLICATION STATUS INFORMATION IN A NETWORKED VIRTUALIZATION ENVIRONMENT FOR STORAGE MANAGEMENT

CROSS REFERENCE TO RELATED APPLICATION

The present application is a continuation of U.S. patent application Ser. No. 14/251,180, filed on Apr. 11, 2014, and entitled "MECHANISM FOR PROVIDING REAL TIME REPLICATION STATUS INFORMATION IN A NETWORKED VIRTUALIZATION ENVIRONMENT FOR STORAGE MANAGEMENT", which is hereby incorporated by reference in its entirety.

FIELD

This disclosure concerns a mechanism for providing real time replication status information in a networked virtualization environment for storage management

BACKGROUND

In a networked virtualization environment for storage management, several nodes (e.g., servers, data centers) share a plurality of storage devices over a network. Each node may include local storage devices (e.g., solid state drive (SSD)) and the networked virtualization environment may also include several networked storage devices (e.g., cloud storage, storage area network (SAN), network file servers). Nodes within the virtualization environment for storage management may access networked storage devices and/or local storage devices of other nodes in the virtualization environment through the network. Likewise, nodes may communicate amongst each other over the same network.

Each node may host several user virtual machines, and virtual disks may be exposed by a node to its corresponding user virtual machines. In order to facilitate disaster recovery and to ensure that data for a user virtual machine will always be available, data for each virtual disk in the networked virtualization environment for storage management will be replicated in multiple physical storage locations.

Although it is desirable to maintain a certain replication factor for data associated with each virtual disk in the networked virtualization environment, some situations may arise that cause data for a virtual disk to have a number of physical copies (e.g., replicas) that falls below the desired replication factor at any given time. This may be due to the failure of the physical disk at which a replica of the data is located or failure of the software mechanism which is performing the replication process.

It is important to monitor the replication status of the networked virtualization environment for storage management. Monitoring the replication status may facilitate maintenance and upgrades to the networked virtualization environment. For example, data for a given virtual disk may have a replication factor of 2 (e.g., physical copies at 2 different nodes in the networked virtualization environment). Having this knowledge in hand, an administrator of the networked virtualization environment may determine that it is possible to shut down any one node (e.g., for purposes of maintenance or upgrade) while still ensuring that a copy of the data is available to a user virtual machine requesting that data. At the same time, the administrator may also determine that it is not possible to shut down any two nodes while ensuring that a copy of the data is available to a requesting user virtual machine because those two nodes may happen to be the two nodes where copies of the data are located.

Thus, it is desirable to implement a mechanism for providing near real time replication for a networked virtualization environment.

SUMMARY

Embodiments of the present invention provide a mechanism for providing real time replication status information in a networked virtualization environment for storage management.

Further details of aspects, objects, and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 4 is a table illustrating one example set of information that may be provided when generating the real time replication status for the networked virtualization environment for storage management.

FIG. 5 is a table illustrating one example set of real time replication status information that may be provided for a particular vDisk in the networked virtualization environment for storage management.

FIGS. 7A and 7B are diagrams illustrating an example for providing real time replication status information to an administrator of a networked virtualization environment for storage management according to some embodiments of the invention.

FIGS. 8A and 8B are diagrams illustrating another example for providing real time replication status information to an administrator of a networked virtualization environment for storage management according to some embodiments of the invention.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material or characteristic described in connection with the embodiments is included in at least one embodiment. Thus, the appearances of the phrase "in some embodiments" or "in other embodiments", in various places throughout this specification are not necessarily referring to the same embodiment.

Embodiments of the present invention provide a mechanism for providing real time replication status information in a networked virtualization environment for storage management.

In a networked virtualization environment for storage management, several nodes (e.g., servers, data centers) share a plurality of storage devices over a network. Each node may include local storage devices (e.g., solid state drive (SSD)) and the networked virtualization environment may also include several networked storage devices (e.g., cloud storage, storage area network (SAN), network file servers). Nodes within the virtualization environment for storage management may access networked storage devices and/or local storage devices of other nodes in the virtualization environment through the network. Likewise, nodes may communicate amongst each other over the same network.

Figure 1:
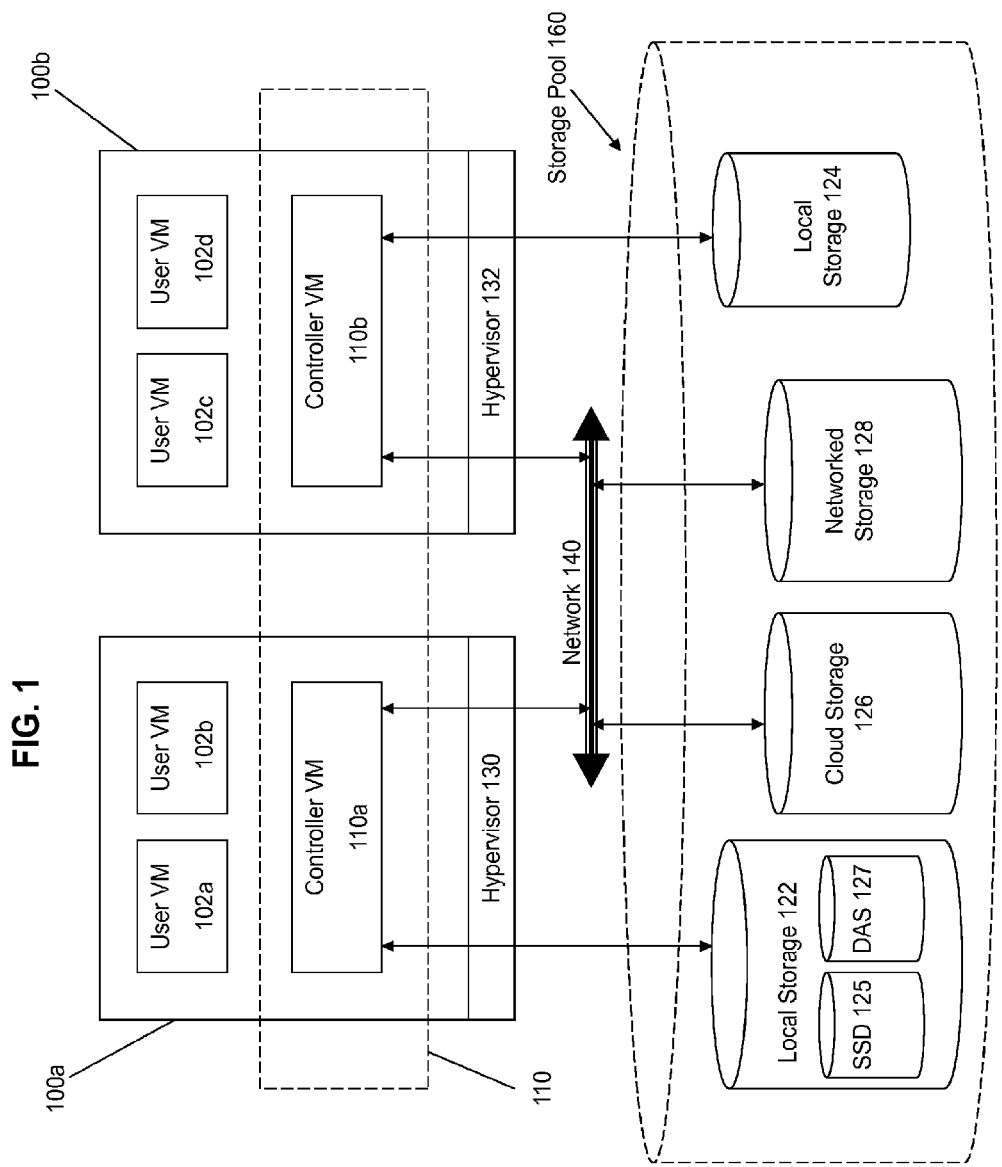
FIG. 1 illustrates an example architecture to implement I/O and storage device management in a virtualization environment according to some embodiments of the invention.

FIG. 1 illustrates an architecture for implementing storage management in a virtualization environment according to some embodiments of the invention. The architecture of FIG. 1 can be implemented for a distributed platform that contains multiple servers 100a and 100b that manages multiple-tiers of storage. The multiple tiers of storage includes storage that is accessible through a network 140, such as cloud storage 126 or networked storage 128 (e.g., a SAN or "storage area network"). Unlike the prior art, the present embodiment also permits local storage 122/124 that is within or directly attached to the server and/or appliance to be managed as part of the storage pool 160. Examples of such storage include Solid State Drives (henceforth "SSDs") 125 or Hard Disk Drives (henceforth "HDDs" or "spindle drives") 127. These collected storage devices, both local and networked, form a storage pool 160. Virtual disks (or "vDisks") can be structured from the storage devices in the storage pool 160, as described in more detail below. As used herein, the term vDisk refers to the storage abstraction that is exposed by a Controller VM to be used by a user VM. In some embodiments, the vDisk is exposed via iSCSI ("internet small computer system interface") or NFS ("network file system") and is mounted as a virtual disk on the user VM.

Each server 100a or 100b runs virtualization software, such as VMware ESX(i), Microsoft Hyper-V, or RedHat KVM. The virtualization software includes a hypervisor 130/132 to manage the interactions between the underlying hardware and the one or more user VMs 102a, 102b, 102c, and 102d that run client software.

A special VM 110a/110b is used to manage storage and I/O activities according to some embodiment of the invention, which is referred to herein as a "Controller VM". This is the "Storage Controller" in the currently described architecture. Multiple such storage controllers coordinate within a cluster to form a single-system. The Controller VMs 110a/110b are not formed as part of specific implementations of hypervisors 130/132. Instead, the Controller VMs run as virtual machines above hypervisors 130/132 on the various servers 102a and 102b, and work together to form a distributed system 110 that manages all the storage resources, including the locally attached storage 122/124, the networked storage 128, and the cloud storage 126. Since the Controller VMs run above the hypervisors 130/132, this means that the current approach can be used and implemented within any virtual machine architecture, since the Controller VMs of embodiments of the invention can be used in conjunction with any hypervisor from any virtualization vendor.

Each Controller VM 110a-b exports one or more block devices or NFS server targets that appear as disks to the client VMs 102a-d. These disks are virtual, since they are implemented by the software running inside the Controller VMs 110a-b. Thus, to the user VMs 102a-d, the Controller VMs 110a-b appear to be exporting a clustered storage appliance that contains some disks. All user data (including the operating system) in the client VMs 102a-d resides on these virtual disks.

Significant performance advantages can be gained by allowing the virtualization system to access and utilize local (e.g., server-internal) storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Another advantage provided by this approach is that administration activities can be handled on a much more efficient granular level. Recall that the prior art approaches of using a legacy storage appliance in conjunction with VMFS heavily relies on what the hypervisor can do at its own layer with individual "virtual hard disk" files, effectively making all storage array capabilities meaningless. This is because the storage array manages much coarser grained volumes while the hypervisor needs to manage finer-grained virtual disks. In contrast, the present embodiment can be used to implement administrative tasks at much smaller levels of granularity, one in which the smallest unit of administration at the hypervisor matches exactly with that of the storage tier itself.

Yet another advantage of the present embodiment of the invention is that storage-related optimizations for access and storage of data can be implemented directly within the primary storage path. For example, in some embodiments of the invention, the Controller VM 110*a* can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Controller VMs include quality of service (QOS) functions, encryption, and compression. The new architecture massively parallelizes storage, by placing a storage controller—in the form of a Controller VM—at each hypervisor, and thus makes it possible to render enough CPU and memory resources to achieve the aforementioned optimizations.

As mentioned above, each node may host several user virtual machines, and virtual disks may be exposed by a node to its corresponding user virtual machines. In order to facilitate disaster recovery and to ensure that data for a user virtual machine will always be available, data for each virtual disk in the networked virtualization environment for storage management will be replicated in multiple physical storage locations.

Although it is desirable to maintain a certain replication factor for data associated with each virtual disk in the networked virtualization environment, some situations may arise that cause data for a virtual disk to have a number of physical copies that falls below the desired replication factor. This may be due to the failure of the physical disk at which a replica of the data is located or failure of the software mechanism which is performing the replication process.

It is important to monitor the replication status of the networked virtualization environment for storage management. Monitoring the replication status may facilitate maintenance and upgrades to the networked virtualization environment. For example, data for a given virtual disk may have a replication factor of 2 (e.g., physical copies at 2 different nodes in the networked virtualization environment). Having this knowledge in hand, an administrator of the networked virtualization environment may determine that it is possible to shut down any one node (e.g., for purposes of maintenance or upgrade) while still ensuring that a copy of the data is available to a user virtual machine requesting that data. At the same time, the administrator may also determine that it is not possible to shut down any two nodes while ensuring that a copy of the data is available to a requesting user virtual machine because those two nodes may happen to be the two nodes where copies of the data are located.

As noted above, the Controller VM is the primary software component within the server that virtualizes I/O access to hardware resources within a storage pool according to embodiments of the invention. This approach essentially provides for a separate and dedicated controller for each and every node within a virtualized data center (a cluster of nodes that run some flavor of hypervisor virtualization software), since each node will includes its own Controller VM. This is in contrast to conventional storage architectures that provide for a limited number of storage controllers (e.g., four controllers) to handle the storage workload for the entire system, and hence results in significant performance bottlenecks due to the limited number of controllers. Unlike the conventional approaches, each new node will include a Controller VM to share in the overall workload of the system to handle storage tasks. Therefore, the current approach is infinitely scalable, and provides a significant advantage over the conventional approaches that have a limited storage processing power. Consequently, the currently described approach creates a massively-parallel storage architecture that scales as and when hypervisor hosts are added to a datacenter.

Figure 2:
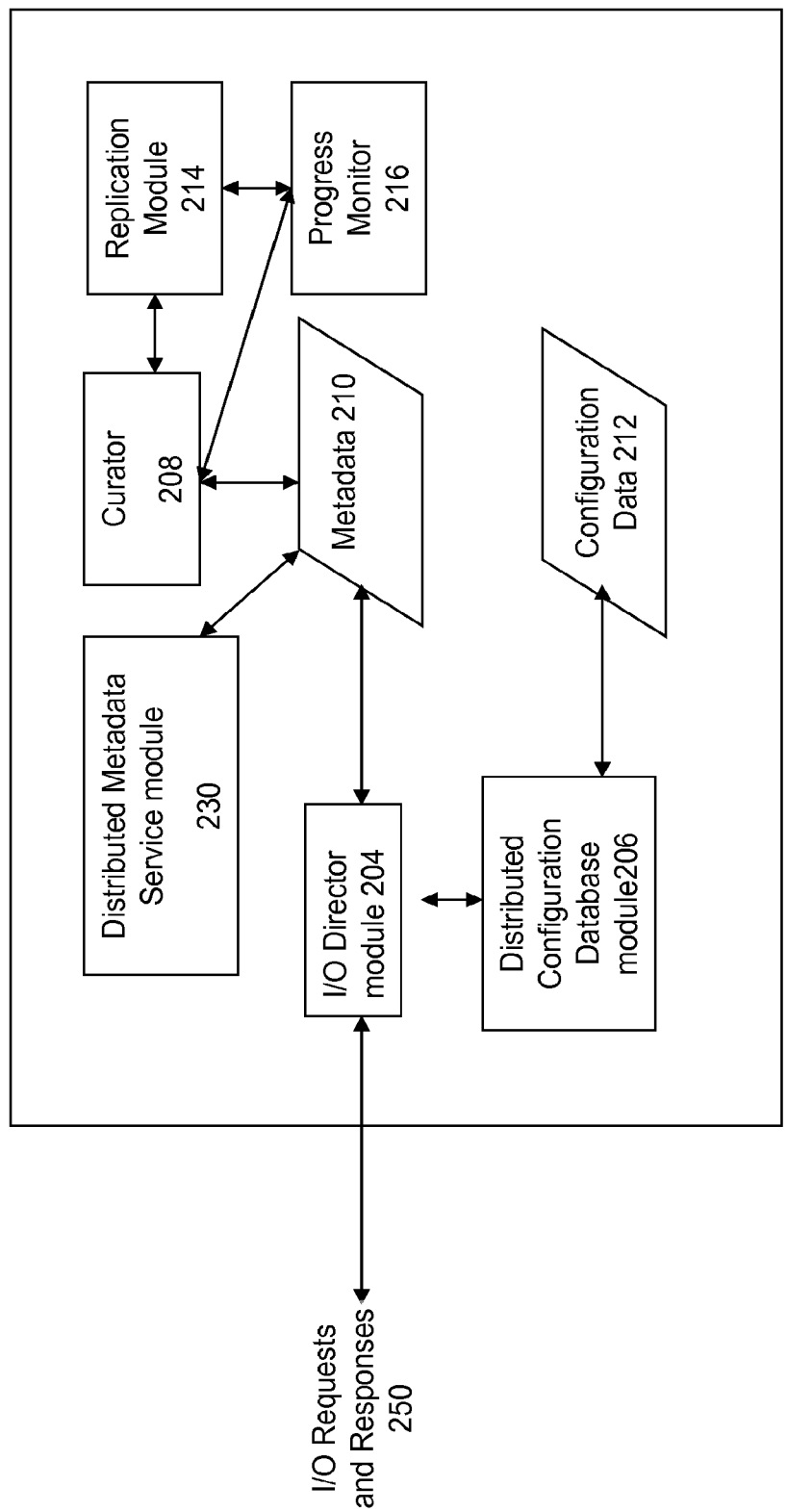
FIG. 2 illustrates the components of a Controller VM according to some embodiments of the invention.

The mechanism for providing real time replication status for the networked virtualization environment for storage management may be implemented by the Controller VMs residing at each node. FIG. 2 illustrates the internal structures of a Controller VM according to some embodiments of the invention. As previously noted, the Controller VMs are not formed as part of specific implementations of hypervisors. Instead, the Controller VMs run as virtual machines above hypervisors on the various nodes. Since the Controller VMs run above the hypervisors, this means that the current approach can be used and implemented within any virtual machine architecture, since the Controller VMs of embodiments of the invention can be used in conjunction with any hypervisor from any virtualization vendor. Therefore, the Controller VM can be configured to operate ubiquitously anywhere within the computing environment, and will not need to be custom-configured for each different type of operating environment. This is particularly useful because the industry-standard iSCSI or NFS protocols allow the Controller VM to be hypervisor-agnostic.

The main entry point into the Controller VM is the central controller module 204 (which is referred to here as the "I/O Director module 204"). The term I/O Director module is used to connote that fact that this component directs the I/O from the world of virtual disks to the pool of physical storage resources. In some embodiments, the I/O Director module implements the iSCSI or NFS protocol server.

A write request originating at a user VM would be sent to the iSCSI or NFS target inside the Controller VM's kernel. This write would be intercepted by the I/O Director module 204 running in user space. I/O Director module 204 interprets the iSCSI LUN or the NFS file destination and converts the request into an internal "vDisk" request (e.g., as described in more detail below). Ultimately, the I/O Director module 204 would write the data to the physical storage.

Each vDisk managed by a Controller VM corresponds to a virtual address space forming the individual bytes exposed as a disk to user VMs. Thus, if the vDisk is of size 1 TB, the corresponding address space maintained by the invention is 1 TB. This address space is broken up into equal sized units called vDisk blocks. Metadata 210 is maintained by the Controller VM to track and handle the vDisks and the data and storage objects in the system that pertain to the vDisks. The Metadata 210 is used to track and maintain the contents of the vDisks and vDisk blocks.

In order to determine where to write and read data from the storage pool, the I/O Director module 204 communicates with a Distributed Metadata Service module 230 that maintains all the metadata 210. In some embodiments, the Distributed Metadata Service module 230 is a highly available, fault-tolerant distributed service that runs on all the Controller VMs in the appliance. The metadata managed by Distributed Metadata Service module 230 is itself kept on the persistent storage attached to the appliance. According to some embodiments of the invention, the Distributed Metadata Service module 230 may be implemented on SSD storage.

Since requests to the Distributed Metadata Service module 230 may be random in nature, SSDs can be used on each server node to maintain the metadata for the Distributed Metadata Service module 230. The Distributed Metadata Service module 230 stores the metadata that helps locate the actual content of each vDisk block. If no information is found in Distributed Metadata Service module 230 corresponding to a vDisk block, then that vDisk block is assumed to be filled with zeros. The data in each vDisk block is physically stored on disk in contiguous units called extents. Extents may vary in size when de-duplication is being used. Otherwise, an extent size coincides with a vDisk block. Several extents are grouped together into a unit called an extent group. An extent group is then stored as a file on disk. The size of each extent group is anywhere from 16 MB to 64 MB. In some embodiments, an extent group is the unit of recovery, replication, and many other storage functions within the system.

Further details regarding methods and mechanisms for implementing Metadata 210 are described below and in co-pending application Ser. No. 13/207,357, now issued as U.S. Pat. No. 8,850,130, issued on Sep. 30, 2014, which is hereby incorporated by reference in its entirety.

A health management module 208 (which may hereinafter be referred to as a "Curator") is employed to address and cure any inconsistencies that may occur with the Metadata 210. The Curator 208 oversees the overall state of the virtual storage system, and takes actions as necessary to manage the health and efficient performance of that system. According to some embodiments of the invention, the curator 208 operates on a distributed basis to manage and perform these functions, where a master curator on a first server node manages the workload that is performed by multiple slave curators on other server nodes. MapReduce operations are performed to implement the curator workload, where the master curator may periodically coordinate scans of the metadata in the system to manage the health of the distributed storage system. Further details regarding methods and mechanisms for implementing Curator 208 are disclosed in co-pending application Ser. No. 13/207,365, now issued as U.S. Pat. No. 8,549,518, issued on Oct. 1, 2013, which is hereby incorporated by reference in its entirety.

One of the tasks performed by the Curator module 208 a controller VM at a particular node is overseeing the replication status of vDisks belonging to user VMs residing at that node. By performing a scan of the metadata 210, a curator module 208 may identify whether a vDisk belonging to a user VM is under replicated. When the curator module 208 identifies that a vDisk is under replicated, it may generate one or more replication tasks for creating replicas of the vDisk that are sent to a replication module 214. The replication module 214 then performs the replication tasks it has been provided. According to some embodiments of the invention, the replication module 214 operates on a distributed basis to manage and perform these functions, where a master replication module on a first server node manages the workload that is performed by multiple slave replication modules on other server nodes.

A progress monitor module 216 that is in communication with the replication module 214 tracks the progress of the replication tasks being completed by the replication module 214. In some embodiments, the progress monitor module 216 may also communicate with the curator module 208 to identify the replication status of vDisks belonging to user VMs residing at the time of the scan. By consolidating the information from the curator module 208 (e.g., replication status of vDisks belonging to user VMs residing at the time of the scan) and the current progress of replication tasks being completed by the replication module 214, the progress monitor module 216 may determine a real time replication status for vDisks at its node.

Because the networked virtualization environment for storage management operates in a distributed manner, in some embodiments each controller VM may be responsible for determining the replication status of its corresponding vDisks. The controller VMs may then communicate amongst each other to provide the replication status of all vDisks in the networked virtualization environment for storage management.

Some of the Controller VMs also includes a Distributed Configuration Database module 206 to handle certain administrative tasks. The primary tasks performed by the Distributed Configuration Database module 206 are to maintain configuration data 212 for the Controller VM and act as a notification service for all events in the distributed system. Examples of configuration data 212 include, for example, (1) the identity and existence of vDisks; (2) the identity of Controller VMs in the system; (3) the physical nodes in the system; and (4) the physical storage devices in the system. For example, assume that there is a desire to add a new physical disk to the storage pool. The Distributed Configuration Database module 206 would be informed of the new physical disk, after which the configuration data 212 is updated to reflect this information so that all other entities in the system can then be made aware for the new physical disk. In a similar way, the addition/deletion of vDisks, VMs and nodes would handled by the Distributed Configuration Database module 206 to update the configuration data 212 so that other entities in the system can be made aware of these configuration changes.

Another task that is handled by the Distributed Configuration Database module 206 is to maintain health information for entities in the system, such as the Controller VMs. If a Controller VM fails or otherwise becomes unavailable, then this module tracks this health information so that any management tasks required of that failed Controller VM can be migrated to another Controller VM.

The Distributed Configuration Database module 206 also handles elections and consensus management within the system. Another task handled by the Distributed Configuration Database module is to implement ID creation. Unique IDs are generated by the Distributed Configuration Database module as needed for any required objects in the system (e.g., for vDisks, Controller VMs, extent groups, etc.). In some embodiments, the IDs generated are 64-bit IDs, although any suitable type of IDs can be generated as appropriate for embodiment so the invention. According to some embodiments of the invention, the Distributed Configuration Database module 206 may be implemented on an SSD storage because of the realtime guarantees required to monitor health events.

Figure 3:
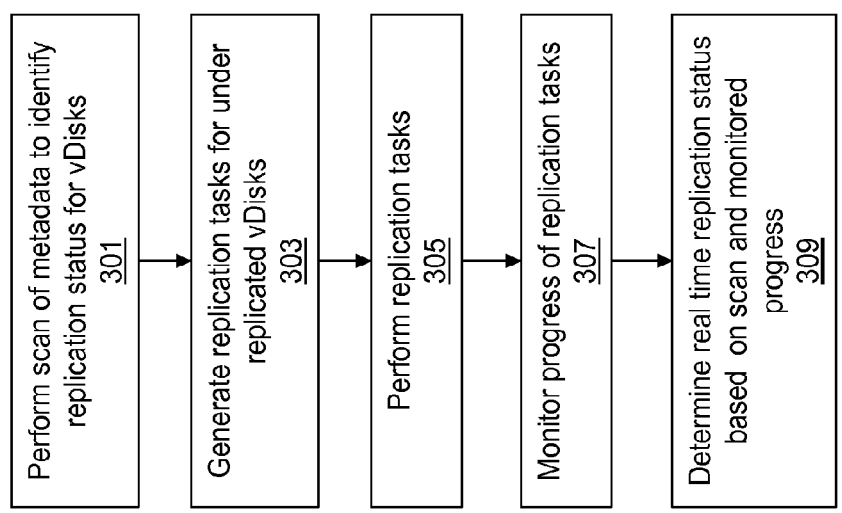
FIG. 3 is a flow diagram illustrating a mechanism for providing real time replication status for a networked virtualization environment for storage management.

FIG. 3 is a flow diagram illustrating a mechanism for providing real time replication status for a networked virtualization environment for storage management.

Initially, a scan of the metadata is performed to identify replication status for vDisks in the networked environment for storage management as shown at 301. The scan of the metadata may be performed by a controller VM at each node. Each controller VM may identify the replication status for vDisks it is managing by scanning the metadata. As described above, the curator module of the controller VM may perform the scan of the metadata.

In some embodiments, the scan of the metadata may be performed periodically. For example, a scan of the metadata may be performed every hour or half hour to identify the replication status for vDisks. In other embodiments, the scan of the metadata may be performed in response to the failure of a physical disk or the failure of a software mechanism which is performing the replication process.

Because the metadata for vDisks in the networked virtualization environment for storage management is being generated and stored in real time, the replication status identified by the scan will accurately reflect the real time replication status of vDisks in the networked virtualization environment. The replication status for a given vDisk may include: (1) the user VM to which the vDisk belongs to, (2) the total size of the vDisk, (3) the amount of data within the vDisk that is under replicated, and (4) the replication factor for the vDisk.

At any given time, certain vDisks in the networked virtualization environment for storage management may be under replicated. This may be due to failure of physical disks in the storage environment, failure of software mechanisms performing the replication process, or unavailability of physical disks due to maintenance. A vDisk is under replicated when its current replication factor (e.g., number of copies of the vDisk within the networked virtualization environment for storage management) falls below its desired replication factor. For example, where a given vDisk has a desired replication factor of 3 and only 2 copies of the vDisk are available in the networked virtualization environment for storage management, the vDisk is determined to be under replicated.

After the replication status for vDisks in the networked environment for storage management have been identified, replication tasks are generated for under replicated vDisks as shown at 303. The generation of replication tasks may be performed by a controller VM at each node and each controller VM may generate replication tasks for under replicated vDisks it is managing. As described above, the curator module of the controller VM may generate the replication tasks.

In some embodiments, the replication tasks generated for under replicated vDisks may be generated on a vDisk block basis. For example, a given under replicated vDisk may have certain blocks that are under replicated and certain blocks that have a desired replication factor. Replication tasks may be generated for those blocks that are under replicated, while no replication tasks are generated for blocks that have the desired replication factor.

After the replication tasks have been generated for under replicated vDisks, the replication tasks are performed as shown at 305. The replication tasks may be performed by a controller VM at each node. As described above, the replication module of the controller VM may perform the replication tasks that it receives from the curator module. According to some embodiments of the invention, the replication module operates on a distributed basis to manage and perform these functions, where a master replication module on a first server node manages the workload that is performed by multiple slave replication modules on other server nodes.

In some embodiments, the replication tasks are performed in the order in which they are received. In other embodiments, the replication tasks may be performed in an order different than the order in which they are received.

The progress of the replication tasks being performed for under replicated vDisks is monitored as shown at 307. The progress of the replication tasks being performed at a node may be monitored by the controller VM for that node. As described above, the progress monitor module of the controller VM may monitor the progress of replication tasks. Each time a replication task is completed, the progress monitor module of the controller VM may record information associated with the replication task, such as which vDisk or vDisk block was replicated.

The real time replication status of the networked virtualization environment for storage management is then determined based on the scan and the monitored progress of replication tasks as shown at 309. The scan of the metadata identifies the replication status for vDisks in the networked virtualization environment as of the time of the scan. The information recorded when monitoring progress of replication tasks identifies vDisks or vDisk blocks that have been replicated since the scan and may be combined with the replication status at the time of the scan to determine a real time replication status for the networked virtualization environment. For example, the scan may indicate that a particular vDisk is under replicated with a current replication factor of 2 and a desired replication factor of 5. After the scan, two additional replication tasks may have been performed for that vDisk. At the time that the real time replication status is requested, the progress monitor module may identify that two replicas of the vDisk have been performed since the scan (from monitoring progress of replication tasks), and that the vDisk had a replication factor of 2 at the time of the scan (from replication status identified by scan). It then combines these two pieces of information to return a real time replication status for the vDisk that indicates a real time replication factor of 4.

The real time replication status generated for the networked virtualization environment for storage management may include various different pieces of information at varying degrees of granularity. FIG. 4 is a table illustrating one example set of information that may be provided when generating the real time replication status for the networked virtualization environment for storage management.

In FIG. 4, the set of real time replication status information is provided on a per vDisk basis, where real time replication status information is provided for each vDisk in the networked virtualization environment for storage management. However, it is important to note that the set of real time replication status information may be provided at varying degrees of granularity. For example, the set of real time replication status information may be provided on a per user VM basis where replication status information is provided for each user VM in the networked virtualization environment for storage management. Alternatively, the set of real time replication status information may be provided on a per physical disk basis where replication status information is provided for data residing within each physical disk in the networked virtualization environment for storage management.

In FIG. 4, the set of real time replication status information for each vDisk includes the user VM to which the vDisk belongs, the total size of the vDisk, the amount of data within the vDisk that is under replicated, and the replication factor for the vDisk.

Each vDisk in the networked virtualization environment for storage management is identified by a vDisk ID. For purposes of example, the vDisk ID for each vDisk includes the user VM to which it belongs and a sequence indicator. Thus, a first vDisk belonging to user VM 1 would have a vDisk ID 1-A.

In FIG. 4, vDisk 1-A (e.g., first vDisk belonging to user VM 1) has a total size of 100 GB, includes 20 GB of under replicated data and has a replication factor of 1. vDisk 1-B (e.g., second vDisk belonging to user VM 1) has a total size of 100 GB, includes 20 GB of under replicated data and has a replication factor of 3. vDisk 2-A (e.g., first vDisk belonging to user VM 2) has a total size of 500 GB, includes 20 GB of under replicated data and has a replication factor of 1. vDisk 2-B (e.g., second vDisk belonging to user VM 2) has a total size of 100 GB, includes 20 GB of under replicated data and has a replication factor of 4. vDisk 3-A (e.g., first vDisk belonging to user VM 3) has a total size of 250 GB, includes 20 GB of under replicated data and has a replication factor of 4. vDisk N-A (e.g., first vDisk belonging to user VM N) has a total size of 100 GB, includes 20 GB of under replicated data and has a replication factor of 4. vDisk N-B (e.g., second vDisk belonging to user VM N) has a total size of 500 GB, includes 20 GB of under replicated data and has a replication factor of 1.

An administrator or other user of the networked virtualization environment for storage management may obtain additional real time replication status information about a particular vDisk by selecting the vDisk. FIG. 5 is a table illustrating one example set of real time replication status information that may be provided for a particular vDisk in the networked virtualization environment for storage management. A vDisk is selected and a set of real time replication status information for that vDisk is provided that includes each extent group associated with the vDisk along with the replication factor for those extent groups.

In FIG. 5, the vDisk 1-A is selected. Each extent group 1-5 associated with vDisk 1-A along with the replication factor for each extent group 1-5 is then provided. Here, extent group 1 has a replication factor of 1, meaning that only a single copy of extent group 1 exists in the networked virtualization environment for storage management. Extent group 2 has a replication factor of 2, meaning that two copies of extent group 2 exist in the networked virtualization environment for storage management. Extent group 3 has a replication factor of 3, meaning that three copies of extent group 3 exist in the networked virtualization environment for storage management. Extent group 4 has a replication factor of 3, meaning that three copies of Extent group 4 exist in the networked virtualization environment for storage management. Extent group 5 has a replication factor of 3, meaning that three copies of extent group 5 exist in the networked virtualization environment for storage management.

In addition to providing real time replication status information per vDisk or for individual vDisks, real time replication status information may also be provided in a format that may be efficiently used by an administrator to quickly determine how to service the networked virtualization environment for storage management. For example, real time replication status information may be provided indicating how many nodes or racks of nodes within the networked virtualization environment for storage management may be shutdown (e.g., fail) at a given time. As used herein, the term "rack of nodes" refers to two or more nodes sharing the same power supply.

Figure 6:
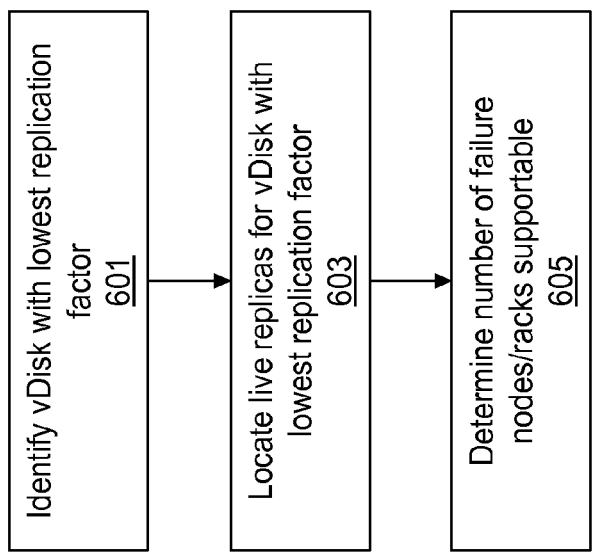
FIG. 6 is a flow diagram illustrating a method for providing real time replication status information to an administrator of a networked virtualization environment for storage management according to some embodiments of the invention.

FIG. 6 is a flow diagram illustrating a method for providing real time replication status information to an administrator of a networked virtualization environment for storage management according to some embodiments of the invention.

Initially, real time replication status information for the networked virtualization environment may be generated in the manner described above in FIG. 3. Using this real time replication status information, a vDisk having the lowest replication factor may be identified as shown at 601.

After the vDisk having the lowest replication factor is identified, the nodes at which the live replicas of the vDisk having the lowest replication factor reside are located as shown at 603. Locating the nodes at which the live replicas of the vDisk having the lowest replication factor reside may involve locating which rack the node resides within. In some embodiments, a vDisk may have one or more replicas on the same node. In other embodiments, a vDisk may have one or more replicas on different nodes in the networked virtualization environment.

Once the nodes having live replicas of the vDisk having the lowest replication factor have been identified, a number of failure nodes or racks of nodes supportable by the networked virtualization environment for storage management is determined as shown at 605. As used herein, the number of failure nodes refers to the number of nodes within the networked virtualization environment that may be shut down, upgraded or otherwise suspended while still ensuring that at least one live replica of the vDisk is available. Similarly, as used herein, the number of failure racks refers to the number of racks of nodes within the networked virtualization environment that may be shut down, upgraded, or otherwise suspended while still ensuring that at least one live replica of the vDisk is available.

In some embodiments, the number of failure nodes supportable by the networked virtualization environment will be determined by subtracting 1 from the number of nodes at which live replicas of the vDisk having the lowest replication factor reside. For example, where the vDisk having the lowest replication factor has 3 replicas residing at 3 different nodes, then the networked virtualization environment can support 2 failure nodes. Thus, even if 2 nodes within the networked virtualization environment fail, and both failed nodes store replicas of the vDisk, at least one other node in the networked virtualization environment will have available a live replica of the vDisk.

In some embodiments, the number of failure racks supportable by the networked virtualization environment will be determined by subtracting one from the number of racks at which live replicas of the vDisk reside having the lowest replication factor reside. For example, where the vDisk having the lowest replication factor has 3 replicas residing at 3 different racks, then the networked virtualization environment can support 2 failure racks. Thus, even if 2 racks within the networked virtualization environment fail, and both failed racks store replicas of the vDisk, at least one other rack in the networked virtualization environment will have available a live replica of the vDisk.

FIGS. 7A and 7B are diagrams illustrating an example for providing real time replication status information to an administrator of a networked virtualization environment for storage management according to some embodiments of the invention.

FIG. 7A is a table illustrating an example set of real time replication status information for the networked virtualization environment. FIG. 7A identifies vDisks and nodes within the networked virtualization environment having live replicas of the vDisks. FIG. 7A also identifies the racks at which the nodes reside.

For purposes of illustration, the networked virtualization environment for storage management depicted in FIG. 7A includes 3 vDisks, namely vDisk 1, vDisk 2 and vDisk 3. The networked virtualization environment for storage management depicted in FIG. 7A also includes 6 nodes which are located in two separate racks. A live replica of vDisk 1 can be found at node 1 and node 2, each of which reside within rack 1. A live replica of vDisk 2 can be found at node 1 and node 2, which reside within rack 1 and also node 4, which resides within rack 2. A live replica of vDisk 3 can be found at node 1, which resides within rack 1 and also nodes 5 and 6, which reside within rack 2.

FIG. 7B is a table illustrating an example set of real time replication status information provided in a format that may be efficiently used by an administrator to quickly determine how to service the networked virtualization environment for storage management. The set of real time replication status information provided in FIG. 7B corresponds to the set of real time replication status information in FIG. 7A.

In order to generate the table of FIG. 7B, a vDisk having the lowest replication factor is first identified by consulting the set real time replication status information provided in FIG. 7A. As is clear from FIG. 7A, vDisk 1 has the lowest replication factor of 2. After vDisk 1 has been identified as having the lowest replication factor, the nodes at which live replicas of vDisk 1 are located is determined. As is clear from FIG. 7A, live replicas of vDisk 1 reside at node 1 and node 2, which are both located within rack 1.

A number of failure nodes or racks of nodes supportable by the networked virtualization environment for storage management is then determined. As mentioned above, the number of failure nodes supportable by the networked virtualization environment will be determined by subtracting 1 from the number of nodes at which live replicas of the vDisk having the lowest replication factor reside. Because there are two nodes at which live replicas of vDisk 1 reside, the networked virtualization environment can support a maximum of 1 failure node.

Also, as mentioned above the number of failure racks supportable by the networked virtualization environment will be determined by subtracting 1 from the number of racks at which live replicas of the vDisk having the lowest replication factor reside. Because there is only 1 rack at which live replicas of vDisk 1 reside, the networked virtualization environment cannot support any failure racks.

In addition to providing information pertaining to how many failure nodes/racks may or may not be supported by the networked virtualization environment, reasoning may also be provided for why a number for failure nodes/racks may or may not be supported. As illustrated in FIG. 7B, 1 failure node may be supported because all vDisks in the networked virtualization environment have a replication factor of at least 2. Also as illustrated in FIG. 7B, 2 failure nodes may not be supported because vDisk 1 has a replication factor of only 2. Also as illustrated in FIG. 7B, 1 failure rack may not be supported because vDisk 1 does not have a live replica in rack 2.

FIGS. 8A and 8B are diagrams illustrating another example for providing real time replication status information to an administrator of a networked virtualization environment for storage management according to some embodiments of the invention.

FIG. 8A is a table illustrating an example set of real time replication status information for the networked virtualization environment. FIG. 8A identifies vDisks and nodes within the networked virtualization environment having live replicas of the vDisks. FIG. 8A also identifies the racks at which the nodes reside.

For purposes of illustration, the networked virtualization environment for storage management depicted in FIG. 8A includes 3 vDisks, namely vDisk 1, vDisk 2 and vDisk 3. The networked virtualization environment for storage management depicted in FIG. 8A also includes 6 nodes which are located in two separate racks. A live replica of vDisk 1 can be found at node 1 which resides within rack 1 and node 6 which resides within rack 2. A live replica of vDisk 2 can be found at node 1 and node 2, which reside within rack 1 and also node 4, which resides within rack 2. A live replica of vDisk 3 can be found at node 1, which resides within rack 1 and also nodes 5 and 6, which reside within rack 2.

FIG. 8B is a table illustrating an example set of real time replication status information provided in a format that may be efficiently used by an administrator to quickly determine how to service the networked virtualization environment for storage management. The set of real time replication status information provided in FIG. 8B corresponds to the set of real time replication status information in FIG. 8A.

In order to generate the table of FIG. 8B, a vDisk having the lowest replication factor is first identified by consulting the set of real time replication status information provided in FIG. 8A. As is clear from FIG. 8A, vDisk 1 has the lowest replication factor of 2. After vDisk 1 has been identified as having the lowest replication factor, the nodes at which live replicas of vDisk 1 are located is determined. As is clear from FIG. 8A, live replicas of vDisk 1 reside at node 1, which is located within rack 1 and node 6 which is located within rack 2.

A number of failure nodes or racks of nodes supportable by the networked virtualization environment for storage management is then determined. As mentioned above, the number of failure nodes supportable by the networked virtualization environment will be determined by subtracting 1 from the number of nodes at which live replicas of the vDisk having the lowest replication factor reside. Because there are two nodes at which live replicas of vDisk 1 reside, the networked virtualization environment can support a maximum of 1 failure node.

Also, as mentioned above the number of failure racks supportable by the networked virtualization environment will be determined by subtracting 1 from the number of racks at which live replicas of the vDisk having the lowest replication factor reside. Because there are two racks at which live replicas of vDisk 1 reside, the networked virtualization environment can support one failure rack.

In addition to providing information pertaining to how many failure nodes/racks may or may not be supported by the networked virtualization environment, reasoning may also be provided for why a number for failure nodes/racks may or may not be supported. As illustrated in FIG. 8B, 1 failure node may be supported because all vDisks in the networked virtualization environment have a replication factor of at least 2. Also as illustrated in FIG. 8B, 2 failure nodes may not be supported because vDisk 1 has a replication factor of only 2. Also as illustrated in FIG. 8B, 1 failure rack may be supported because all vDisks in the networked virtualization environment have replicas in both racks 1 and 2.

Although the mechanism for providing real time replication status for a networked virtualization environment for storage management has been described at the vDisk level, it is important to note that the mechanism may be extended to provide real time replication status for a networked virtualization environment for storage management at a vDisk block level. For example, rather than determining the replication status for each vDisk in the networked virtualization environment, the replication status may be determined at a finer level of granularity, namely for each vDisk block.

System Architecture

Figure 9:
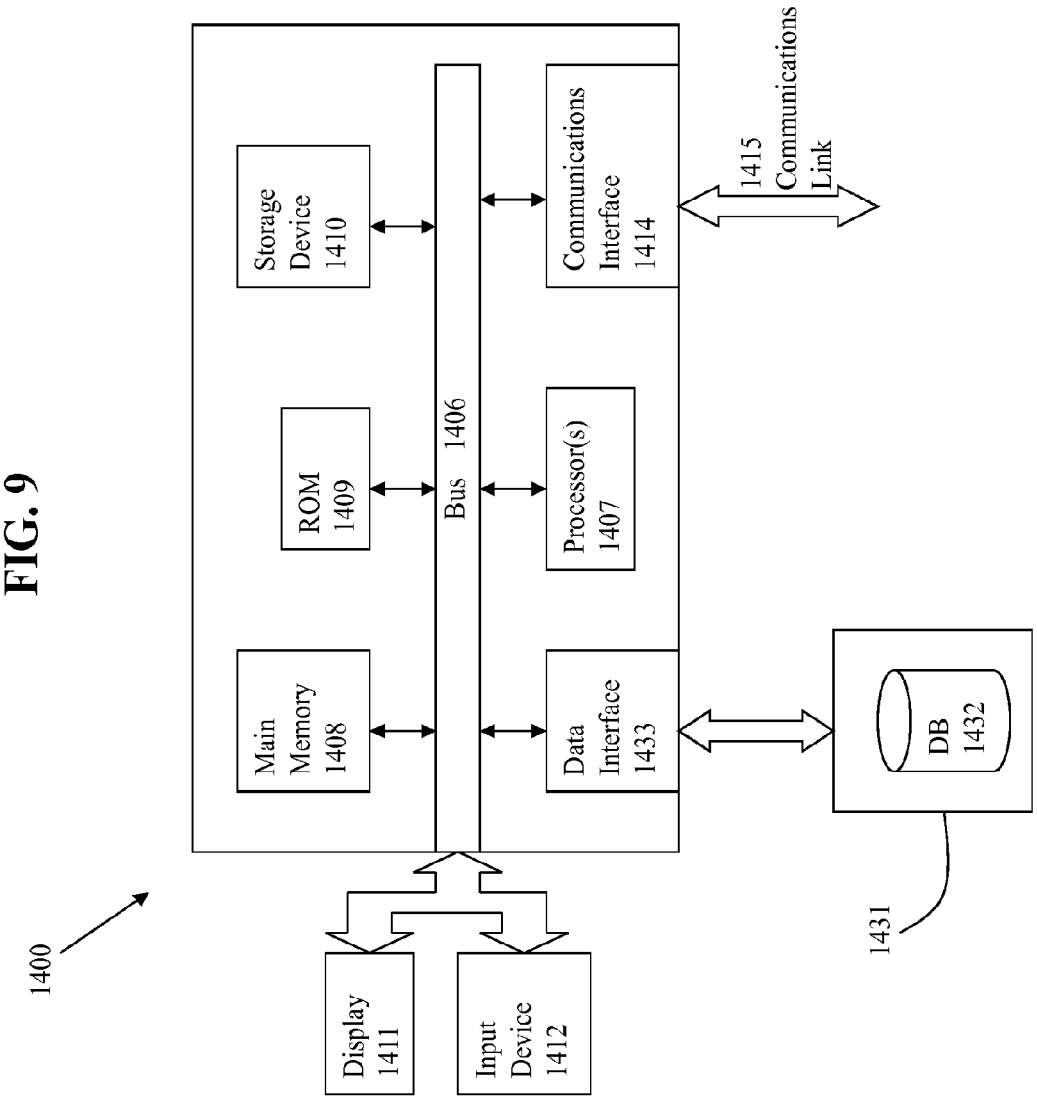
FIG. 9 is a block diagram of an illustrative computing system 1400 suitable for implementing an embodiment of the present invention.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for monitoring replications for storage management, comprising:
    identifying one or more virtual disks (vDisks) and one or more replication factors associated with the one or more vDisks;
    identifying a vDisk with a lowest replication factor;
    locating a replica for the vDisk with the lowest replication factor; and
    determining a number of failure nodes or a number of failure racks based at least on the location of the replica for the vDisk with the lowest replication factor, wherein the number of failure nodes or the number of failure racks correspond to a number of nodes or a number of racks supportable by a networked virtualization network to shut down while providing that at least one replica of the vDisk is available.

2. The method of claim 1, wherein locating the replica for the vDisks with the lowest replication factor comprises locating which rack a node resides within.

3. The method of claim 1, wherein determining the number of failure nodes or the number of failure racks is determined by subtracting 1 from the number of nodes or the number of racks at which live replicas of the vDisk having the lowest replication factor resides.

4. The method of claim 1, wherein identifying the one or more vDisks and the one or more replication factors further comprises scanning metadata to identify replication status for all vDisks in a networked virtualization environment.

5. The method of claim 1, further comprising:
    providing a reasoning corresponding to why the number of failure nodes or the number of failure racks may or may not be supported.

6. The method of claim 1, further comprising:
    generating a table containing information corresponding to an identification of the vDisks and nodes within a networked virtualization environment having replicas of the vDisk.

7. The method of claim 1, further comprising:
    generating a table containing information corresponding to how to service a networked virtualization environment for storage management.

8. A computer program product embodied on a non-transitory computer readable medium, the non-transitory computer readable medium having stored thereon a sequence of instructions which, when executed by a processor causes the processor to execute a method for monitoring replications for storage management, comprising:
    identifying one or more virtual disks (vDisks) and one or more replication factors associated with the one or more vDisks;
    identifying a vDisk with a lowest replication factor;
    locating a replica for the vDisk with the lowest replication factor; and
    determining a number of failure nodes or a number of failure racks based at least on the location of the replica for the vDisk with the lowest replication factor, wherein the number of failure nodes or the number of failure racks correspond to a number of nodes or a number of racks supportable by a networked virtualization network to shut down while providing that at least one replica of the vDisk is available.

9. The computer program product of claim 8, wherein locating live replicas for vDisks with the lowest replication factor comprises locating which rack a node resides within.

10. The computer program product of claim 8 wherein determining the number of failure nodes is determined by subtracting 1 from the number of nodes at which live replicas of the vDisk having the lowest replication factor resides.

11. The computer program product of claim 8, wherein determining the number of failure nodes or the number of failure racks is determined by subtracting 1 from the number of nodes or the number of racks at which live replicas of the vDisk having the lowest replication factor resides.

12. The computer program product of claim 8, wherein identifying the one or more vDisks and the one or more replication factors further comprises scanning metadata to identify replication status for all vDisks in a networked virtualization environment.

13. The computer program product of claim 8, further comprising:
providing a reasoning corresponding to why the number of failure nodes or the number of failure racks may or may not be supported.

14. The computer program product of claim 8, further comprising:
generating a table containing information corresponding to an identification of the vDisks and nodes within a networked virtualization environment having replicas of the vDisk.

15. A system, comprising;
a processor;
a memory comprising a computer code executed using the processor, in which a computer code implements:
identifying one or more virtual disks (vDisks) and one or more replication factors associated with the one or more vDisks;
identifying a vDisk with a lowest replication factor;
locating a replica for the vDisk with the lowest replication factor; and
determining a number of failure nodes or a number of failure racks based at least on the location of the replica for the vDisk with the lowest replication factor, wherein the number of failure nodes or the number of failure racks correspond to a number of nodes or a number of racks supportable by a networked virtualization network to shut down while providing that at least one replica of the vDisk is available.

16. The system of claim 15, wherein locating live replicas for vDisks with the lowest replication factor comprises locating which rack a node resides within.

17. The system of claim 15, further comprising:
providing a reasoning corresponding to why the number of failure nodes or the number of failure racks may or may not be supported.

18. The system of claim 15, wherein determining the number of failure nodes or the number of failure racks is determined by subtracting 1 from the number of nodes or the number of racks at which live replicas of the vDisk having the lowest replication factor resides.

19. The system of claim 15, further comprising:
generating a table containing information corresponding to an identification of the vDisks and nodes within a networked virtualization environment having replicas of the vDisk.

20. The system of claim 15, further comprising:
generating a table containing information corresponding to how to service a networked virtualization environment for storage management.

* * * * *